Figure 1:
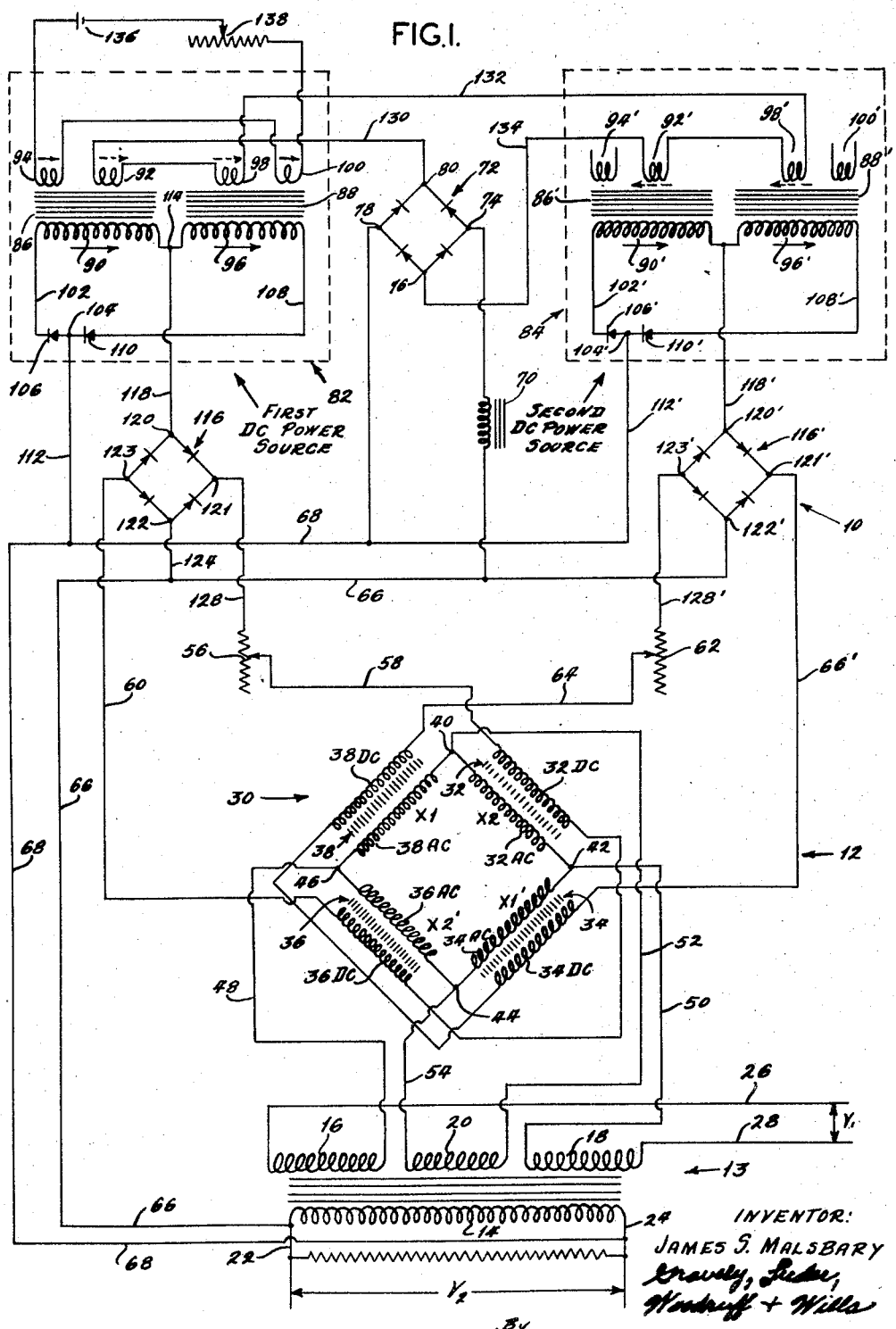

June 23, 1959  J. S. MALSBARY  2,892,146
AUTOMATIC CONTROL FOR VOLTAGE CONTROL DEVICE
Filed March 30, 1955  4 Sheets-Sheet 2
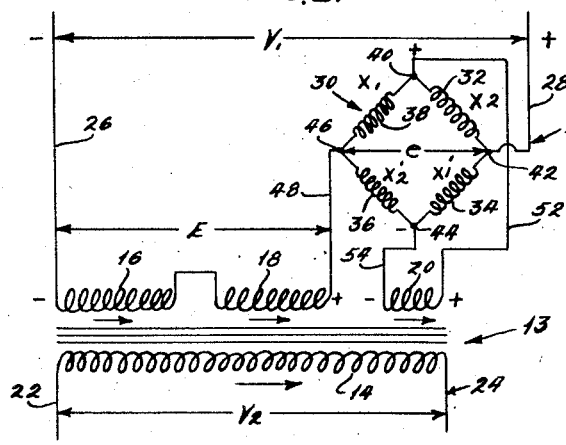
FIG. 2.
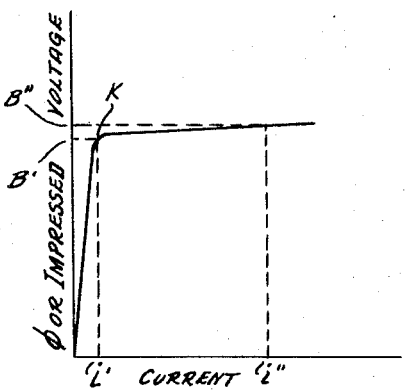
FIG. 3.
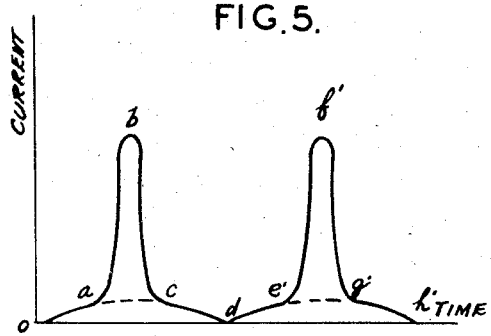
FIG. 5.
FIG. 4.
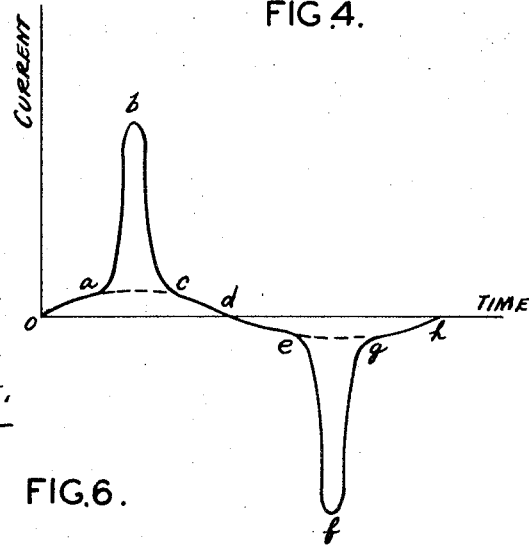
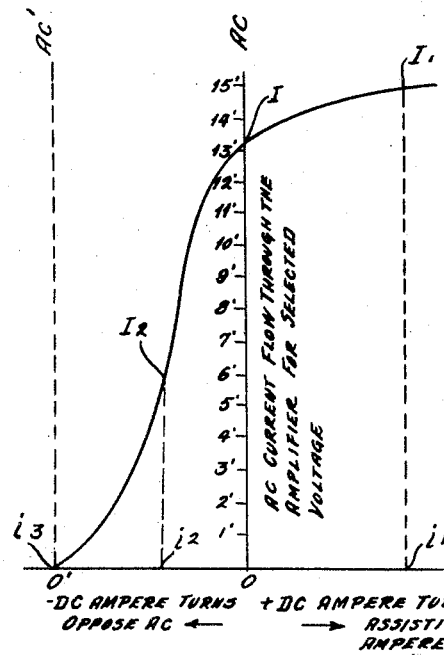
FIG. 6.
INVENTOR:
JAMES S. MALSBARY
ATTORNEYS.

June 23, 1959  J. S. MALSBARY  2,892,146
AUTOMATIC CONTROL FOR VOLTAGE CONTROL DEVICE
Filed March 30, 1955  4 Sheets-Sheet 4

INVENTOR
JAMES S. MALSBARY
ATTORNEYS.

United States Patent Office 2,892,146
Patented June 23, 1959

2,892,146

AUTOMATIC CONTROL FOR VOLTAGE
CONTROL DEVICE

James S. Malsbary, Glendale, Mo., assignor to Wagner Electric Corporation, St. Louis, Mo., a corporation of Delaware Application March 30, 1955, Serial No. 497,978

22 Claims. (Cl. 323—66)

The present invention relates generally to the voltage regulator art and more particularly to a novel automatic control responsive to pre-selected physical conditions, for use with a voltage control device of the type shown and described in my copending application Serial No. 429,465, filed May 13, 1954, by means of which the output voltage of a transformer can be automatically maintained substantially constant regardless of variations in the primary voltage within predetermined limits.

The invention described in the aforementioned application comprises means in combination with a transformer for providing a variable compensating or adjusting voltage which is superposed on, or injected into either the input or the output voltage of the transformer so as to maintain the output voltage at substantially the desired value regardless of changes in the supply voltage within predetermined limits.

In the preferred construction disclosed in said application, the adjusting voltage is developed in a bridge circuit of four saturable core reactors whose impedances are responsive to selected external conditions, the magnitude and direction of the adjusting voltage being determined by the relative impedance values of the arms of the bridge circuit.

In the aforementioned disclosure, the impedances of the saturable core reactors are manually controlled by means of D.C. power sources and variable resistors connected in series with the D.C. coils of opposed reactors. As pointed out in that application, the impedances of the reactors can be varied automatically, responsive to any selected external condition such as for example, output voltage, supply current, load current, or the like.

The present invention concerns the control for automatically varying the impedances of the various saturable core reactors responsive to preselected external conditions.

It is an object of the present invention to provide a novel automatic control of the type described, by means of which the voltage at a desired point of the transformer output circuit can be automatically and continuously maintained substantially constant over long periods of time without requiring maintenance or adjustment. More particularly, it is an object to provide such a control which does not contain any rotating or moving parts and which can be preset and sealed, and which will then continue to operate without close supervision, and even though subjected to extreme changes in temperature and other physical conditions.

Another object is to provide a control which causes a transformer output voltage to follow a predetermined pattern upon variation of input voltage within certain limits. More particularly, it is an object to provide such a control in which the operating and adjusting characteristics can be predetermined by selecting reactors and other components having the desired operational curves with respect to reactance and current.

Another object is to provide a control of the type described which is substantially noiseless, i.e., which produces no more noise than that produced by a conventional transformer in normal operation.

Further objects and advantages of the present invention will be readily apparent from the following detailed description, reference being had to the accompanying drawings wherein a preferred embodiment of the present invention is shown.

Briefly, the present invention includes means for producing a variable compensating voltage to be injected into, or to be superposed on the primary or secondary voltage of a transformer, said means including two sets of saturable core reactors, each set of which contains at least one D.C. winding for controlling the reactance thereof. A first current producing means is provided for supplying a variable D.C. current for one of said D.C. windings, and a second current producing means is provided for supplying another variable D.C. current for the other D.C. winding. The output of each of said D.C. current producing means is proportional to the magnitude of the voltage to be regulated; in addition, the output of one of the current producing means is directly proportional to the magnitude of said voltage above a predetermined value, and the output of the other current producing means is inversely proportional to said voltage above the predetermined value.

Figure 7:
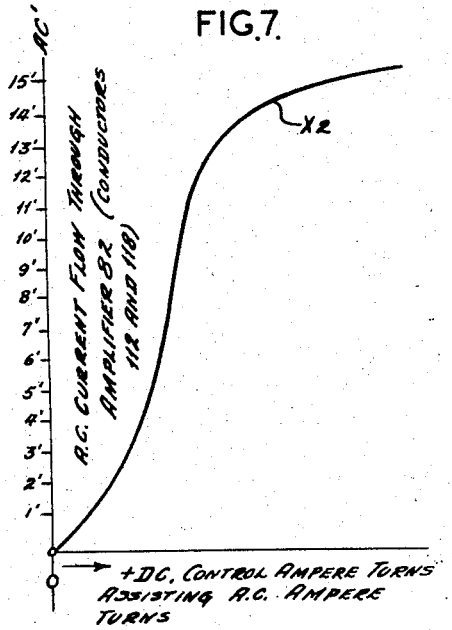
Figure 8:
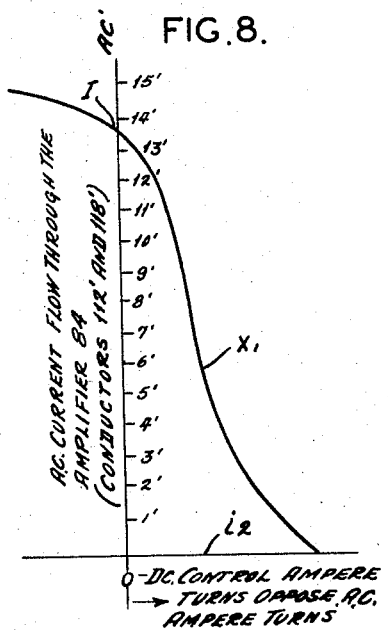
Figure 12:
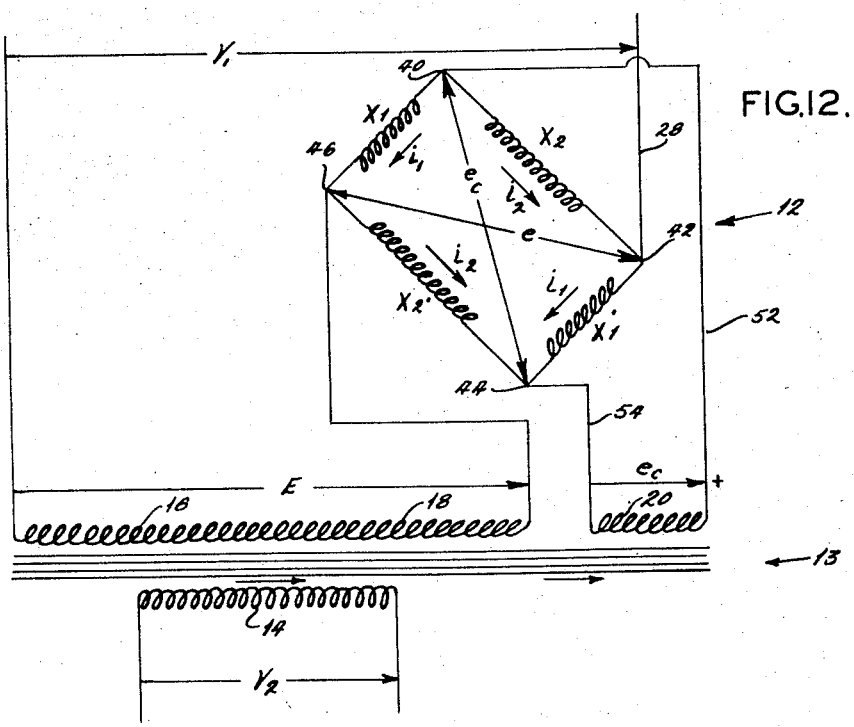
Figure 10:
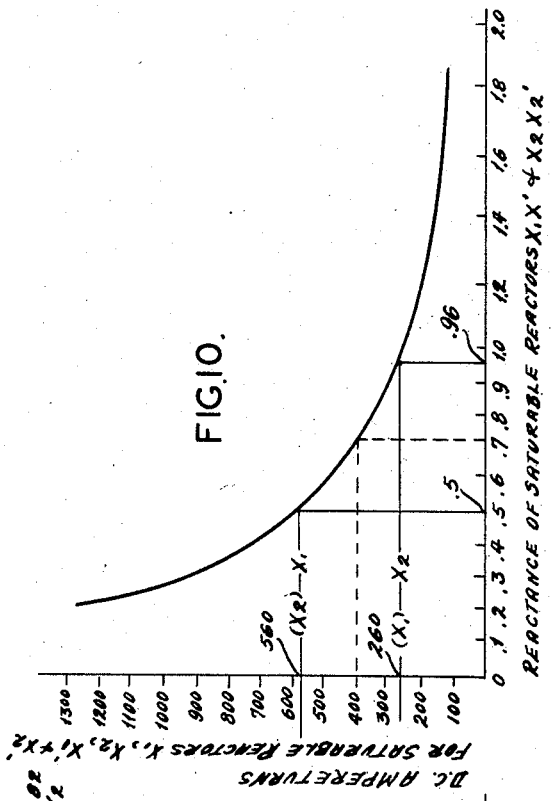
Figure 9:
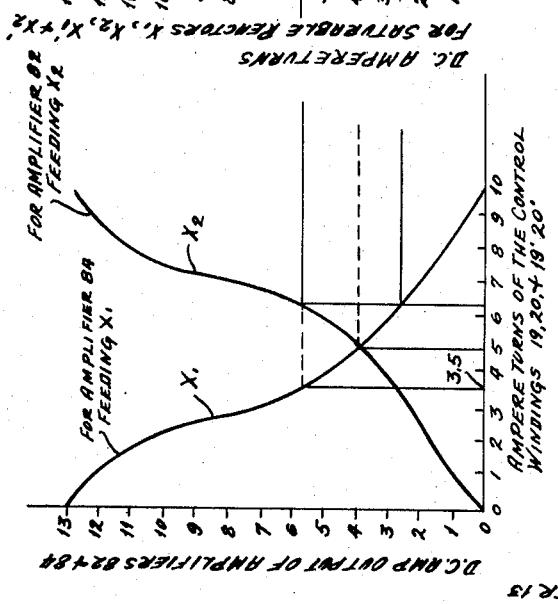
Figure 11:
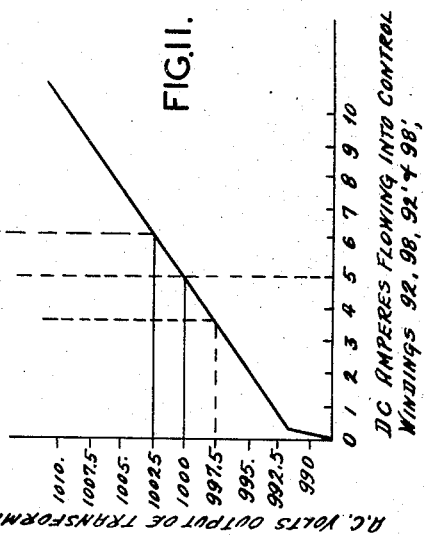

In the drawings:

Fig. 1 is a schematic wiring diagram of the basic circuit construction showing an automatic control constructed in accordance with the teachings of the present invention, in combination with a compensating voltage device and transformer of the type shown and described in my copending application, Serial No. 429,465, filed May 13, 1954, Fig. 2 is a simplified schematic diagram of the compensating voltage device 12 and the transformer 13, the D.C. windings of the saturable core reactors being omitted for convenience of illustration, Fig. 3 is the magnetization curve for the voltage detector 70, Fig. 4 is a time-current curve for the voltage detector 70 before the current is rectified, Fig. 5 is a time-current curve for the voltage detector 70 after the current has been rectified, Fig. 6 is an A.C. current-D.C. ampere turn curve for the magnetic amplifiers 82 and 84, Fig. 7 is the A.C. current-DC. control ampere turn curve for the amplifier 82 wherein the D.C. bias ampere turns magnetize in opposition to the A.C. ampere turns to cutoff and the D.C. control ampere turns magnetize in the same direction as the A.C. ampere turns, Fig. 8 is the A.C. current-D.C. control ampere turn curve for the amplifier 84 wherein the D.C. bias windings are not energized and the D.C. control ampere turns magnetize in a direction opposite to that of the A.C. ampere turns, Fig. 9 is a combined A.C. current-D.C. control ampere turn curve for both the amplifiers 82 and 84, as results when Fig. 8 is superposed on Fig. 7, Fig. 10 is D.C. ampere turn-reactance curve for the saturable core reactors in the Wheatstone bridge circuit, Fig. 11 is a voltage-D.C. ampere curve for the voltage detector, similar to the type of curve shown in Fig. 3 using a suppressed but very large A.C. voltage ordinate scale, and Fig. 12 is a simplified schematic drawing of the Wheatstone bridge circuit and the transformer.

Referring to the drawings more particularly by reference numerals, specifically Fig. 1, the numeral 10 indicates generally an automatic control embodying the teachings of the present invention, shown in combination with a compensating voltage device 12 and a transformer 13, the voltage device 12 and transformer 13 being similar to those shown and described in my aforementioned copending application.

The transformer 13 includes a secondary winding 14, two primary windings 16 and 18, and a correcting winding 20 shown on the primary side, but which functions as another secondary, as will be described more fully hereinafter.

Load leads 22 and 24 are connected to the secondary winding 14, and supply leads 26 and 28 are connected to the primary winding 16 and 18. The impressed supply voltage is indicated as $V_1$, and the secondary voltage is indicated as $V_2$.

The network circuit or compensating voltage device 12, which controls the magnitude and direction, i.e., the phase relation of an adjusting voltage "$e$" (Fig. 2), comprises four saturable core reactors 32, 34, 36 and 38, containing laminated iron cores. Each of the saturable reactors includes a D.C. winding and an A.C. winding. In the following description, the A.C. and D.C. windings will be referred to as 32AC, 32DC, 34AC, 34DC, etc.

The A.C. windings of the four reactors are connected together in a so-called Wheatstone bridge circuit (Fig. 1), the windings 38AC and 32AC being connected together at a corner 40, the windings 32AC and 34AC being connected together at a corner 42, the windings 34AC and 36AC being connected together at a corner 44, and the windings 36AC and 38AC being connected together at a corner 46.

A conductor 48 connects the corner 46 with one side of the primary winding 16, and a conductor 50 connects the corner 42 with one side of primary winding 18, thereby providing a power connection for the aforementioned bridge circuit.

The other two corners of the bridge circuit, i.e., corners 40 and 44, are connected to the correcting winding 20 through conductors 52 and 54, respectively.

As described in the aforementioned application, the impedances of the reactors in the arms of the bridge circuit are controlled so that diametrically opposite arms have substantially the same impendance. In order to accomplish this result, the windings 32DC and 36DC are connected together in series, and are connected in series with what we will term a first D.C. power source (which will be described more fully hereinafter) and a variable resistor 56, through conductors 58 and 60.

In like manner, the windings 34DC and 38DC are connected together in series, and in series with a so-called Second D.C. power source and a variable resistor 62, through conductors 64 and 66'.

Thus, by controlling the amounts of D.C. currents flowing from the First and Second D.C. power sources and into the D.C. windings of the reactors, the A.C. impedance of each of the reactors can be varied and the magnitude and direction of the injected or adjusting voltage "$e$" controlled at will.

Fig. 2 is a simplified schematic diagram of the compensating voltage device 12 and the transformer 13 which are shown in the lower portion of Fig. 1, the D.C. windings being omitted for convenience of illustration. Referring to this figure, let us assume that the supply voltage $V_1$ is normal; therefore, if the load voltage $V_2$ is to be normal, it is necessary that the supply voltage $V_1$ equal the induced voltage E.

Assuming that the voltage induced in the correcting winding 20 is in the direction so that the right-hand end is a higher potential than the left-hand end thereof, the conductor 52 and the corner 40 of the bridge circuit 30 will be at a higher potential than the conductor 54 and the corner 44 of the bridge circuit. However, if the impedances of all of the reactors, 32, 34, 36 and 38 are equal (as shown diagrammatically in Fig. 2), the voltage drops across the reactors 32 and 38 will be the same; and, if they are also in phase, the corners 46 and 42 will be at the same potential, and the adjusting voltage "$e$" (which is across the corners 42 and 46) will be zero. This is true for the simple cases where either the load current is zero or is small in comparison with the current flowing through the reactors due to the voltage induced in the correcting winding 20. The voltage E equals the voltage $V_1$ plus or minus the voltage "$e$," and, inasmuch as the voltage "$e$" is zero, the voltage E equals the voltage $V_1$.

On the other hand, if the voltage drops across the reactors are unequal, the adjusting voltage "$e$" will either oppose or aid $V_1$ and can vary from close to zero to close to the voltage induced in the correcting winding 20, depending upon the relative values of the impedances and which pair of reactors has the greater impedance drop. For further information as to the phase relationships and the changes which occur under load conditions in which the load current is relatively large in comparison with the current flowing in the reactors, refer to the aforementioned copending application.

As previously mentioned, the automatic control 10 which is the subject matter of the present invention, can be made responsive to supply current, load current, secondary voltage, load voltage, or the like. In the present description, the automatic control will be considered to be responsive to the voltage across the secondary of the transformer 13.

Referring again to Fig. 1, leads 66 and 68 are connected to the output leads 22 and 24, respectively, of the transformer 13, and extend upwardly to provide the source for the D.C. currents which are controlled as to their magnitude and channelled back through the two D.C. power sources to the D.C. windings of the four saturable core reactors, as will be described more fully hereinafter.

Connected to the lead 66 is a voltage detector 70 which acts as a current regulating valve and which feeds into a conventional full-wave bridge-type rectifier 72 which contains corners 74, 76, 78 and 80. The voltage detector 70 does not permit an appreciable current to flow until the voltage across leads 66 and 68 exceeds a predetermined value, and then the increase in current flow is in direct proportion to the increase in voltage above the critical value. The voltage detector 70 preferably comprises a coil wound around a core of special steel, such as, for example, iron-nickel alloy, so as to have a D.C. magnetization curve similar to that shown in Fig. 3. As will be more fully discussed hereinafter, the flatter the curve above the knee "K," the better will be the voltage regulation across the secondary of the transformer 13.

Fig. 3 shows that for the induction range O—B', the magnetizing current $i'$ is very small. However, after the induction exceeds the value B', the required magnetizing current increases very rapidly for a very slight increase in the induction.

The same combination of coil and core subjected to an impressed sine-shaped 60 cycle voltage passes a small sine-shaped current as shown in Fig. 4 (curve o—a—c—d—e—g—h) so long as the maximum induction does not exceed the value O—B' in Fig. 3. If, for a short time interval, the maximum induction reaches the value B", the relatively large current O—i" flows. In this latter case, the current has the shape o—a—b—c—d. In the next half of the sine curve, the current wave has the shape d—e—f—g—h. With a bridge type rectifier such as 72 in series with the detector 70, the current d—e—f—g—h in Fig. 4, is reversed, and the rectified or uni-directional current on the load side of the rectifier has a shape similar to that shown in Fig. 5.

Fig. 4 shows the A.C. current shape when the reactance of the coil is much larger than its resistance. The distortion of the current wave will become less as the resistance in the detector circuit is increased because the reactance is no longer the predominating factor in the circuit and the currents will have a true sine shape if the circuit contains only resistance. Thus, adding resistance in the detector circuit decreases the distortion of the current shape but in a general way the characteristic curve shown in Fig. 5 remains the same, provided the resistance change is within reasonable limit. However, for a given impressed A.C. voltage, the peak value of the current is lower than that which occurs when no resistance is in the circuit. Thus, it is desirable to have as low a resistance as possible in the winding of the detector.

Other types of voltage detectors can be used provided their characteristics are such that the output current increases rapidly with each increase in voltage after a certain voltage is exceeded. Consequently, various vacuum tubes can be used in place of the magnetic detector just described. Also, some bridge circuits can be used for the same purpose; for example, a bridge circuit can be used which consists of two opposite arms containing standard resistances whose ohmic values are independent of impressed voltage, the other opposite arms of the bridge consisting of a material which changes its resistance rapidly with increasing or decreasing voltage. The current flowing in the load circuit of this bridge, therefore, changes rapidly with any change of the input voltage.

The rectifier 72 which is associated with the voltage detector, feeds into control windings which are contained in the magnetic amplifiers in the First and Second D.C. power sources, which will now be described. As mentioned hereinabove, the First and Second D.C. power sources provide the controlled currents for the D.C. windings of the saturable core reactors in the bridge circuit and are shown in the upper portion of Fig. 1.

The First D.C. source (shown on the left) contains a so-called self-saturating magnetic amplifier 82 which includes iron cores 86 and 88. The core 86 contains an A.C. winding 90, a D.C. control winding 92, and a D.C. bias winding 94. The core 88, in like manner, contains an A.C. winding 96, a D.C. control winding 98, and a D.C. bias winding 100.

A conductor 102 connects the left-hand end of the A.C. winding 90 to a junction point 104 through a rectifier 106. In like manner, a conductor 108 connects the right-hand end of the winding 96 to the junction point 104 through a rectifier 110. The junction point 104, in turn, is connected by a conductor 112 to the lead 68 which is connected to one side of the transformer secondary.

The inner ends of the A.C. windings 90 and 96 are connected together at a junction point 114 and are connected to a full wave rectifier 116 by means of a conductor 118. The rectifier contains corners 120, 121, 122, and 123. The corner 122 is connected to the other lead 66 of the transformer secondary by a conductor 124, and the corner 123 is connected to the winding 36DC by the conductor 60. The other corner 121 is connected to the variable resistor 56 by a conductor 128. Thus, the windings 36DC and 32DC of the saturable core reactors are connected across the rectifier circuit 116 which in turn is fed from the amplifier 82 in the First D.C. power source.

Turning briefly to a consideration of the Second D.C. power source and the self-saturating magnetic amplifier 84 which determines the amount of D.C. current which is fed into the windings 38DC and 34DC of the saturable core reactors in the bridge circuit, it is substantially identical in construction to the First D.C. power source and the amplifier 82, and like parts are identified by the same number, primed.

Returning to a consideration of the amplifier 82; the control windings 92 and 98 are connected together, and the left-hand end of the winding 92 is connected to the corner 80 of the rectifier 72 by a conductor 130. The opposite or right-hand end of the winding 98 is connected to one end of the winding 98' in the amplifier 84 by means of a conductor 132, and the other end of the winding 98' is connected to one end of the winding 92' which has the other end thereof connected to the corner 76 of the rectifier 72 by a conductor 134. Thus, the A.C. current which passes through the voltage detector 70, is rectified in the rectifier 72, and passes through the control windings 92, 98, 98' and 92' which are connected together in series.

In addition to the control windings, the cores 86, 88, 86', and 88' also contain bias windings 94, 100, 94' and 100', respectively. As shown in Fig. 1, the bias windings 94 and 100 are connected in series with a battery 136 and a variable resistor 138. Although the windings 94' and 100' are not connected to any power source, they could be energized in like manner. Also, it is to be understood that the bias windings 94 and 100, or 94' and 100' could obtain power from the leads 66 and 68, as by means of a rectifier circuit. In short, it is merely necessary that there be a source of adjustable D.C. current for the bias windings, for reasons to be discussed hereinafter.

Turning next to a consideration of the operation of the so-called magnetic amplifier 82; during the first half cycle of the A.C. current (which hereinafter will be called positive) the current flows from lead 68 through the conductor 112, the rectifier 106, and the windings 90 to the junction point 114, and back through the conductor 118 to the rectifier 116 (and the windings 32DC and 36DC), and through the conductor 124 to the lead 66.

During the next half cycle (which will hereinafter be called negative) the direction of the current is reversed, and it flows from the lead 66, through the conductor 124, the rectifier 116 (and the winding 32DC and 36DC), and the conductor 118 to the junction 114, and thence through the winding 96, the conductor 108, the rectifier 110, and the conductor 112 to the lead 68.

Thus, during all positive half cycles the current flows through the winding 90 and for all negative half cycles the current flows through the winding 96. Consequently, the current in the conductor 118 consists of positive half cycle current and negative half cycle current; in short, the conductor 118 carries a conventional alternating current. During all positive half cycles, the current flows through the winding 90 in a direction to produce a magnetization as indicated by the arrow, and during all negative half cycles the current flows through the winding 96 in a direction to produce a magnetization as indicated by the arrow.

It is readily apparent that for a given A.C. voltage across the leads 66 and 68, the value of the A.C. current flowing in the conductors 112 and 124—118 depends primarily on the reactances of the windings 90 and 96. These in turn are dependent upon the magnitude and direction of the D.C. currents which flow in the bias windings 94 and 100, and in the control windings 92 and 98. The effect of these control and bias windings on the output current of the amplifiers will now be discussed.

If, for example, the first (positive) half cycle of the A.C. current wave travels through the main winding 90 and magnetizes the core 86 in the direction indicated by the arrow, and at the same time a constant D.C. bias current flows from the battery 136 through the bias winding 94 in a direction to magnetize the core in the same direction, the total ampere turns magnetizing the core is the sum of these D.C. ampere turns. The same result is produced in the core 88 when the D.C. ampere turns of the bias winding 100 magnetizes in the same direction as the ampere turns of the main A.C. winding 96 produced by the negative half wave of the A.C. current. Consequently, the magnetization effect of the A.C. and D.C. currents produces a higher induction in the cores 86 and 88 when the bias windings are excited than when they are not excited, i.e., provided the D.C. bias windings 94 and 100 (or the control windings 92 and 98) are so connected as to magnetize in the same direction as the A.C. windings 90 and 96. Consequently, each core is more saturated when the D.C. bias windings assist the magnetization produced by the A.C. winding, and therefore, the upper or flatter part of the magnetization curve is active and the reactance of each of the windings 90 and 96 is lower than it would be if the D.C. bias windings 94 and 100 were not excited.

If, on the other hand, a D.C. current is sent through the bias windings 94 and 100 in a direction to oppose the A.C. ampere turns, the reactance of each of the windings 90 and 96 would be higher than when no D.C. current is flowing. Thus, for a given A.C. voltage across the conductors 66 and 68, the A.C. current flowing through the main A.C. windings 90 and 96 (as well as in the conductors 112 and 118) is a minimum when the D.C. magnetization in the bias windings 94 and 100 opposes the A.C. magnetization, and it is at a maximum when the D.C. magnetization aids the A.C. magnetization.

Referring to Fig. 6, the tests show that when a fixed A.C. voltage is impressed across the conductors 66 and 68, the A.C. current which flows in the conductors 112 and 118 varies in magnitude in the manner indicated, as the magnitude and direction of the D.C. ampere turns in the bias windings 94 and 100 is changed, while no D.C. current flows through the control windings 92 and 98. The A.C. current flowing through the amplifier 82 is measured along the ordinate O—AC and the D.C. ampere turns are measured along the abscissa; D.C. ampere turns "aiding" the A.C. ampere turns being measured to the right of O, and D.C. ampere turns opposing the A.C. ampere turns being measured to the left of O.

Thus, when there is no D.C. excitation in the bias windings 94 and 100 (and none in the control windings 92 and 98) the A.C. current flowing through the conductors 112 and 118 is in the nature of O—I and is dependent on the "inherent" impedance of the circuit. If there is a D.C. current in the bias windings 94 and 100 which magnetizes in a direction to aid the A.C. ampere turns and it is of the magnitude of O—$i_1$, the A.C. current is increased to $i_1$—$I_1$. On the other hand, if the D.C. ampere turns of the bias windings oppose the A.C. ampere turns and are of the magnitude O—$i_2$, the A.C. current is decreased to $i_2$—$I_2$. Furthermore, if the D.C. ampere turns opposing the A.C. ampere turns are increased to O—$i_3$ the A.C. current becomes zero or reaches a very small value. Thus, the A.C. current flowing from the amplifier 82 can be varied from zero or a very small value, to a maximum value, depending upon the direction and magnitude of the D.C. current flowing through the bias windings 94 and 100.

The discussion hereinabove assumes that the D.C. magnetization in the cores 86 and 88 is produced solely by the bias windings 94 and 100. However, varying amounts of D.C. ampere turns are also obtainable by exciting both the bias windings 94 and 100 and the control windings 92 and 98. If both sets of D.C. windings magnetize in the same direction, the sum of the ampere turns due to the windings 94 and 92 and due to the windings 98 and 100 represent the resultant D.C. ampere turns exciting the cores 86 and 88. If the two sets of D.C. windings magnetize in oposite directions, the resultant D.C. ampere turns is the difference between the ampere turns produced by each set of windings. Hereinafter, the D.C. current flowing through the windings 94 and 100 will be called the bias current and the D.C. current flowing through the windings 92 and 98 will be referred to as the control current.

Referring to Fig. 1 and the amplifier 82, it will be noted that the cores 86 and 88 can be subjected to the magnetizing effect of both the bias windings 94 and 100 and the control windings 92 and 98. If we assume that a constant D.C. current is caused to flow in the bias windings 94 and 100 (so as to have a permanent bias) sufficient to produce ampere turns of the magnitude of O—$i_3$ (Fig. 6) and in the direction to oppose the A.C. winding, the ordinate O—AC can be shifted leftwardly as shown in Fig. 6 to O'—AC' to where there is no current (or very little current) in the A.C. windings. This results in a curve of the type shown in Fig. 7. Thereafter, any D.C. current in the control windings 92 and 98 in the direction to aid the A.C. windings (i.e. to the right in Fig. 7) will result in an A.C. current flowing from the amplifier 82.

Referring now to the amplifier 84; if the bias windings 94' and 100' are not connected to a power source, the normal current flow would be O—I (Fig. 6) and the ordinate remains in the same position. Thus, the amount of A.C. current which flows from the amplifier 84 depends on whether the D.C. curent in the control windings 92' and 98' either aids or opposes the A.C. magnetization. However, because the D.C. current in the control windings 92' and 98' flows in the direction opposite to the direction of flow of the D.C. current in the windings 92 and 98, in order to show the proper graphical relationship between the amplifier 82 and amplifier 84 (as to the change in A.C. current caused by the flow of D.C. current in the control windings which are connected in series), it is desirable to reverse the curve shown in Fig. 6, so as to have the result shown in Fig. 8. In short, any increase in D.C. current (which is in the direction to oppose the A.C. magnetization), causes a resulting decrease in the A.C. current.

Therefore, in order to obtain the proper picture as to what happens to the A.C. current flowing from the amplifiers 82 and 84 for the same change in D.C. current in the control windings 92, 98, 92' and 98', it is only necessary to superpose the curves of Fig. 7 and Fig. 8 and obtain the composite shown in Fig. 9.

Thus, when the D.C. ampere turns of the control windings 92, 98, 92' and 98' each has a value of 5, equal A.C. currents flow from the amplifiers 82 and 84 to their respective saturable core reactors in the Wheatstone bridge. On the other hand, if the effective D.C. ampere turns of the control windings are increased (thereby aiding the A.C. magnetization in the amplifier 82 and opposing it in the amplifier 84), the A.C. current flowing from the amplifier 82 is increased and the A.C. current flowing from the amplifier 84 is decreased.

It will be apparent that the shape of these curves and the location of the point of intersection can be controlled by changing the ratio of the currents in the bias windings 94 and 100 as compared with those in the windings 94' and 100', and the number of turns in the control windings 92 and 98 as compared with the number of turns in the windings 92' and 98'. In order to achieve the best regulation, it is advisable to have the curves as steep as possible, and to be as close as possible to a straight line.

We have now considered how the A.C. output of the two amplifiers 82 and 84 can be changed by varying the magnitude and direction of the D.C. excitation of the bias windings 94, 100, 94' and 100' and the control windings 92, 98, 92' and 98'.

As mentioned hereinabove the A.C. current from the amplifier 82 is rectified in the rectifier circuit 116 and fed into the windings 32DC and 36DC of the saturable core reactors in the Wheatstone bridge. In like manner, the amplifier 84 supplies the windings 34DC and 38DC with current through the rectifier circuit 116'.

We shall next consider what effect changes in the D.C. current in the windings 32DC and 36DC and in the windings 34DC and 38DC have on the reactance of the arms $X_2$ and $X_1$, respectively, of the Wheatstone bridge circuit.

When the A.C. winding of a saturable core reactor whose D.C. winding is excited from a separate D.C. source, is connected in series with a given load impedance, and a fixed A.C. voltage is impressed across the reactor-load circuit, it is found that the A.C. current in the circuit is a minimum when the D.C. winding is not excited and that the A.C. current flow increases when the D.C. windings is energized. Thus, it is clear that when the D.C. winding is not excited, the impedance of the reactor is at a maximum, and as the D. C. current is increased, the impedance of the reactor decreases. A curve showing the effect of changes in the D.C. ampere turns of the reactor, on the reactance of each of the saturable core reactors in the arms of the Wheatstone bridge circuit, is shown in Fig. 10. This curve will vary somewhat if the aforementioned load is changed or if the impressed voltage is varied, but if these changes are within reasonable limits, the shape of the reactance curve remains substantially the same. In the discussion of the operation of the device, these slight changes will be neglected and the curve will be assumed to be constant.

In Fig. 10 the D.C. ampere turns produced in the D.C. windings of the saturable core reactors by the D.C. currents flowing from the amplifiers 82 and 84 are measured along the ordinate at the left of the figure and the reactance of each of the saturable core reactors $X_1$, $X'_1$, $X_2$ and $X'_2$ resulting therefrom is measured along the abscissa. Thus, by simultaneously considering Figs. 9 and 10, it is possible to graphically determine the reactance of each of the saturable core reactors caused by a particular D.C. current flowing through the control windings 92, 98, 92' and 98'.

Referring specifically to Fig. 9, if there are five D.C. ampere turns in the control windings (abscissa), the output of each of the amplifiers 82 and 84 will be four D.C. amperes (as read on the ordinate at the left of Fig. 9). If the D.C. windings of the reactors have 100 turns, then the D.C. magnetization produced by the four D.C. amperes therethrough is equal to four hundred ampere turns as read on the ordinate at the left of Fig. 10, and in line with the "4" read in Fig. 9. Then, reading downwardly onto the abscissa in Fig. 10, four hundred ampere turns result in a reactance of seven-tenths ohms in each of the saturable core reactors.

As discussed hereinabove, the amount of D.C. current which flows in the control windings 92, 98, 92' and 98' is determined by the voltage across the leads 66 and 68, and the characteristics of the voltage detector 70. Fig. 3 shows the amount of current which flows through such a detector for various values of impressed voltage but this curve was not plotted for any particular circuit. Inasmuch as the voltage across the voltage detector 70 is proportional to the voltage across the leads 66 and 68, and the D.C. current flowing through the control windings 92, 98, 92' and 98' is proportional to the A.C. current flowing through the winding of the detector 70, a curve can be plotted (Fig. 11) which has the same shape as the curve in Fig. 3 but which shows the amount of D.C. current which will flow through the control windings for each value of A.C. voltage across the leads 66 and 68 (which is the same voltage as across the secondary of the transformer 13). This is the voltage which is to be maintained substantially constant by means of the device which is the subject matter of the present invention.

In Fig. 11 the secondary voltage of the transformer 13 is shown on the ordinate to the left of the figure and the D.C. current which is produced in the control winding is shown along the abscissa. Although the "curve" is actually curved, it is shown in this figure as a straight line for convenience of plotting and determining values.

Thus, it will be apparent that by starting with the secondary voltage across the transformer 13 (Fig. 11), the amount of D.C. current flowing in the control windings 92, 98, 92' and 98' can be determined, and, by projecting that value upwardly into Fig. 9 so as to read it as D.C. ampere turns, the amount of D.C. current, measured in amperes, flowing from each of the amplifiers can be determined, and then, by projecting that value (or those values) across to Fig. 10 where they are read as D.C. ampere turns, the reactances $x_1$, $x_2$, $x_1'$ and $x_2'$ of each of the saturable core reactors $X_1$, $X_2$, $X_1'$ and $X_2'$ can be determined and the amount of injected voltage produced thereby calculated. As to the magnitude and direction of the injected voltage, it will be discussed more fully hereinafter.

Before discussing the percent regulation which is accomplished by using the present invention, it may be advisable to first consider the problem of calculating the portion of the so-called injected voltage "$e$" (Figs. 2 and 12) which is added to, or subtracted from the voltage across the primary winding 16 and 18, or the impressed voltage $V_1$, depending on how one wishes to consider it.

Referring to Fig. 12 which is a simplified drawing of the Wheatstone bridge circuit 12 and the transformer 13 in which the D.C. windings of the reactors $X_1$, $X_2$, $X_1'$ and $X_2'$ are omitted, the impedances of the bridge arms formed by the windings 32AC, 34AC, 36AC and 38AC are such that when steady state conditions exist, the A.C. voltage "$e$" which appears across the corners 42 and 46 of the bridge is of such a magnitude that the vectorial sum of this voltage "$e$" (considering the proper polarity sign) and the supply voltage $V_1$ provides a voltage E across the primary windings 16 and 18 of a value which results in the desired output voltage $V_2$ across the load terminals of the transformer 13. However, when the magnitude of the supply voltage $V_1$ changes, the load voltage $V_2$ also changes somewhat and the unidirectional magnetization of the reactors $X_1$, $X_2$, $X_1'$ and $X_2'$ changes due to the changes of the magnitude of the A.C. current passing through the voltage detector 70 and the functioning of the amplifier circuits 82 and 84.

For illustrative purposes let us assume that when the supply voltage $V_1$ decreases below its normal value, the unidirectional magnetization of the bridge reactors $X_1$ and $X_1'$ increases (causing a decrease in their reactances) and the unidirectional magnetization of the bridge reactors $X_2$ and $X_2'$ decreases (causing an increase in their reactances). These changes in the reactance values of the A.C. windings of the reactors of the bridge arms cause the voltage "$e$" appearing across the corners 42 and 46 of the bridge to be in the direction to aid $V_1$ to maintain the voltage E across the primary windings at close to normal value. This is best understood by assuming that $X_1$ and $X_1'$ are decreased to zero. In such case, it is equivalent to having the corner 42 connected to the left-hand lead 54 of the correcting winding 20, and the corner 46 connected to the right-hand lead 52. For this extreme case, it is apparent that the voltage $V_1$ has the same direction as the voltage induced in the correcting winding 20 and thus these voltages are added together and are impressed across the windings 16 and 18.

In like manner, when the voltage $V_1$ increases above its normal value, the reactance of $X_2$ decreases and the reactance of $X_1$ increases, and the injected voltage "$e$" is in the direction to oppose $V_1$ so as to maintain the voltage E close to its normal value.

This voltage adjusting process is more readily understood by first considering the operation of the saturable reactor bridge 12 which contains two sets of twin reactors. Referring to Fig. 12, if a voltage "$e_c$" is impressed across two opposite points 40 and 44, it follows that the two oppositely located arms of the bridge have the same reactance value and voltage drop, and a voltage "$e$" appears across the terminals 42 and 46 of the bridge. This voltage "$e$" is the difference between the voltage $E_2$ appearing across the corners 40—42 and the voltage $E_1$ appearing across the corners 40—46. This latter voltage also equals that across the corners 42—44. These voltages in turn are a function of the reactance value of the reactors $X_1$, $X_1'$, $X_2$ and $X_2'$ and the current flowing therethrough. When the currents flowing through the reactors are known, the values $E_1$, $E_2$ and "$e$" are readily determined mathematically.

It is assumed that the Wheatstone bridge consists only of reactances and that the transformer when running no load acts like a reactance. Consequently, all the currents flowing in the bridge and in the transformer 13 are co-phasal.

The current $i_2$ flows in the reactors $X_2$ and $X_2'$ and the current $i_1$ flows in the reactors $X_1$ and $X_1'$. Thus the voltage $E_2$ and $E_1$ appearing across these reactors is given by $$E_1 = i_1 x_1$$
$$E_2 = i_2 x_2$$

where $x_1$ is the reactance value of either the reactor $X_1$ or $X_1'$ and $x_2$ is the reactance value of either the reactor $X_2$ or $X_2'$. The bridge or injected voltage $e = E_1 - E_2$. Thus $e = i_1 x_1' - i_2 x_2'$. The voltage $e_c = E_1 + E_2$. Thus $e_c = i_1 x_1 + i_2 x_2'$. From the above it follows that:

$$\frac{e}{e_c} = \frac{i_1 x_1' - i_2 x_2'}{i_1 x_1' + i_2 x_2'}$$

$$e = e_c \left( \frac{i_1 x_1' - i_2 x_2'}{i_1 x_1 + i_2 x_2'} \right)$$

and inasmuch as $x_1' = x_1$ and $x_2' = x_2$, it follows that:

$$e = e_c \frac{i_1 x_1 - i_2 x_2}{i_1 x_1 + i_2 x_2}$$

In order to simplify the analysis, it will be assumed that the currents flowing between the corner 42 and the source, and between the corner 46 and the primary winding are small in comparison with the current flowing through the path 40—46 and 42—44. This condition exists for example, when the transformer is running no load or is only slightly loaded; in which case the current "$I$" flowing from the corners 42 and 46, as previously mentioned, is negligible in comparison with the current $(I + i_2) = i_1$ flowing in branches 40—46 and 42—44. Thus, $i_1 = i_2$. Under these conditions ($i_2 = i_1$), the above equation takes the form:

$$e = e_c \frac{x_1 - x_2}{x_1 + x_2}$$

If, for instance, the voltage "$e_c$" of the correcting winding 20 has a value of 100 volts, and the ratio $$\frac{x_1 - x_2}{x_1 + x_2} = 60\%$$

the bridge voltage "$e$" = $.60 \times 100 = 60$ volts.

As mentioned hereinabove, in order to maintain the output voltage $V_2$ as near normal as possible it is necessary to maintain $E$ as close to normal as possible. Thus, when $V_1$ increases above normal, the voltage "$e$" must oppose $V_1$, and under such conditions $x_2$ is less than $x_1$. On the other hand, when $V_1$ is below normal it is necessary for "$e$" to aid $V_1$ and therefore $x_2$ must be greater than $x_1$. Manifestly, when $V_1$ and $V_2$ are normal, it is desirable for "$e$" to be zero.

Let us assume that normal $V_1$ is 1000 volts, normal $V_2$ is 1000 volts (i.e., there is a 1 to 1 transformer ratio) and that under normal conditions an E.M.F. of 100 volts is induced in the correcting winding 20.

Referring to Fig. 11, let us assume that for a normal secondary voltage of 1000 volts, the characteristic of the voltage detector 70 is such that 5 D.C. amperes flows through the control windings 92, 98, 92' and 98'. Also, that the bias windings of the amplifier 84 are not energized and that the amplifier 82 is biased to cut off, whereby the current characteristic curves are as shown in Fig. 9, and intersect at 5 amperes. Thus, if 5 amperes flow in the control windings, 4 D.C. amperes flow from each of the amplifiers 82 and 84, resulting in 400 D.C. amperes turns (Fig. 10) in the saturable reactor windings. This results in a reactance of .7 ohm for each of the saturable reactors, and because the bridge is balanced, the voltage "$e$" is zero.

If we assume that the secondary voltage has been increased to 1002.5 volts by an increase in the primary voltage $V_1$, 6.2 D.C. amperes would flow in the control windings, providing approximately 2.6 amperes in the amplifier 84, and 5.6 amperes in the amplifier 82 (Fig. 9). Referring to Fig. 10, this would result in 260 D.C. ampere turns for $X_1$ with a corresponding reactance of .96 ohm, and for $X_2$ it would be 560 D.C. ampere turns and a reactance of .5 ohm.

Also because the secondary voltage $V_2$ was increased to 1002.5 volts, the voltage "$e_c$" of the correcting winding was in like manner increased to 100.25 volts.

Thus, inasmuch as:

$$V_1 = E + e$$

and $$e = e_c \frac{x_1 - x_2}{x_1 + x_2}$$

$$e = 100.25 \frac{.96 - .5}{.96 + .5}$$

$$e = 100.25 \frac{.46}{1.46} = 32.2 \text{ volts}$$

Therefore:

$$V_1 = 1002.5 + 32.2$$
$$V_1 = 1034.7 \text{ volts}$$

From the standpoint of voltage regulation, an increase in the supply voltage $V_1$ from 1000 to 1034.7 volts (an increase of 3.47%) resulted in an increase in the secondary voltage $V_2$ of from 1000 to 1002.5 volts (an increase of only .25%). Consequently, the ratio of the percent voltage change is:

$$\frac{.25}{3.47} = 7.2\%$$

Stating it differently, the change in the load voltage was only 7.2% of the change in the supply voltage.

Considering another example, let us assume that the output voltage $V_2$ decreases from 1000 volts to 997.5 volts. This results in $E$ being decreased to 997.5 volts, and, at the same time, "$e_c$" is reduced to 99.75 volts. The problem is to determine the injected voltage "$e$" and compute the impressed voltage $V_1$ which resulted in the decreased output voltage.

Referring to Fig. 11, it will be noted that a secondary voltage $V_2$ of 997.5 volts causes 3.5 amperes to flow in the control windings 92, 98, 92' and 98'. This results in an output of 2.6 amps. from amplifier 82, and an output of 5.6 amps. from amplifier 84 (Fig. 9). From Fig. 10 it will be noted that this results in $X_1$ having a reactance of .5 ohm and $X_2$ a reactance of .96 ohm.

Note that in this case the value of $x_2$ is greater than $x_1$ and therefore "$e$" will have a negative value.

Thus:

$$e = e_c \frac{x_1 - x_2}{x_1 + x_2}$$

$$e = 99.75 \times \frac{.5 - 9.6}{.5 + 9.6}$$

$$e = 99.75 \times \frac{-.46}{1.46} = -31.4 \text{ volts}$$

Inasmuch as $V_1 = E + e$, $$V_1 = 997.5 + (-31.4) = 966.1 \text{ volts}$$

Thus, the supply voltage dropped from 1000 to 966.1 volts (a change of 33.9 volts) while the secondary voltage dropped from 1000 to only 997.5 volts (a change of 2.5 volts).

Consequently, the supply voltage $V_1$ has changed by:

$$\frac{33.9}{1000} = 3.39\%$$

while the output voltage $V_2$ has changed by:

$$\frac{2.5}{1000} = .25\%$$

Therefore, the ratio of percentage voltage change is:

$$\frac{.25}{3.39} = 7.29\%$$

which means that the percentage change of the output voltage is only 7.29% of the change of the input voltage.

Thus, it is readily apparent that the novel automatic control disclosed herein will maintain the secondary or output voltage of the transformer substantially constant regardless of relatively wide variations in the supply voltage. Referring to Fig. 11, it will be noted that the regulation is improved if the curve for the voltage detector 70 has a lesser slope because then each small change in secondary voltage will result in an even greater flow of current in the control windings 92, 98, 92' and 98' with a resultant greater difference between the reactances of $x_1$ and $x_2$. In like manner, if the slopes of the curves in Fig. 9 are increased, a small change in control current will result in a greater difference between the reactance of $x_1$ and $x_2$. The transformer output regulation curve can also be improved by changing the slope of the ampere turns—reactance curve of the saturable core reactors $X_1$ and $X_2$ (Fig. 10). Consequently, it will be readily apparent that a great variety of modifications are possible which permit a voltage regulation of almost any desired value.

Tests made on units constructed in accordance with the teachings of the present invention have shown that the secondary voltage can be maintained within ±.5% of normal when the supply voltage varies ±10%.

Experience has shown that the best results are obtained (when the transformer is loaded non-inductively) when the ratio of the reactances and the ratio of the load current to the currents in the reactors at no load are such that the vector representing the injected voltage "$e$" remains approximately constant when the supply voltage changes from normal −10% to normal +10%.

It has also been determined both experimentally and theoretically that this control device also maintains the output voltage of the transformer within close limits when the supply voltage is held constant and the load on the transformer is varied, or if a combination of load variation and supply voltage variation occurs.

It will also be noted that there are no rotating parts and that the control is comprised of conventional units such as coils, resistances, rectifiers, and the like, which have exceedingly long service life and which can survive rough handling and extreme changes in temperature. In short, an automatic control constructed in accordance with the teachings of the present invention can be adjusted for the desired regulation, and it will then require no more maintenance than is required for the power transformer with which it is used.

Thus, it is readily apparent that there has been provided a novel automatic control which fulfills all of the objects and advantages sought therefor.

It is to be understood that the foregoing description and the accompanying drawings have been given only by way of illustration and example, and that alterations and changes in the present disclosure, which will be readily apparent to one skilled in the art, are contemplated as within the scope of the present invention, which is limited only by the claims which follow.

What is claimed is:

1. In combination, an A.C. voltage source; means for producing a variable compensating voltage including two sets of saturable core reactors, each set of which contains at least one D.C. winding for controlling the reactance thereof; first current producing means for providing a variable D.C. current for one D.C. winding; and second current producing means for providing another variable D.C. current for the other D.C. winding; said first current producing means including a first self-saturating type amplifier having a main A.C. winding, a D.C. control winding, and a D.C. bias winding; said second current producing means including a second self-saturating type amplifier having a main A.C. winding and a D.C. control winding; means connecting the voltage source with each of said main windings; a source of adjustable D.C. current; means connecting said last-named source with the biasing winding of the first amplifier; means connecting together the control windings and connecting them to the voltage source through a rectifier and a current limiting device which is characterized by the fact that a relatively small current is passed therethrough when the voltage is below a predetermined value and a relatively large current is passed proportional to an increase in voltage above the predetermined value.

2. In combination, an A.C. voltage source; means for producing a variable compensating voltage including two sets of saturable core reactors, each set of which contains at least one D.C. winding for controlling the reactance thereof; first current producing means for providing a variable D.C. current for one D.C. winding; and second current producing means for providing another variable D.C. current for the other D.C. winding; said first current producing means including a first self-saturating type amplifier having a main A.C. winding, a D.C. control winding, and a D.C. bias winding; said second current producing means including a second self-saturating type amplifier having a main A.C. winding, and a D.C. control winding; means connecting the voltage source with each of said main A.C. windings; a source of adjustable D.C. current; means connecting said last-named source with the biasing winding of the first amplifier; means connecting together the control windings and connecting them to the voltage source through a rectifier and a current limiting device which is characterized by the fact that a relatively small current is passed therethrough when the voltage is below a predetermined value and a relatively large current is passed proportional to an increase in voltage above the predetermined value; the bias winding of the first amplifier being wound to oppose the main A.C. winding and the control winding being wound to aid the A.C. winding; and the control winding of the second amplifier being wound to oppose its main A.C. winding.

3. In combination, an A.C. voltage source; means for producing a variable compensating voltage including two sets of saturable core reactors, each set of which contains at least one D.C. winding for controlling the reactance thereof; first current producing means for providing a variable D.C. current for one D.C. winding; and second current producing means for providing another variable D.C. current for the other D.C. winding; said first current producing means including a first self-saturating type amplifier having a main A.C. winding, a D.C. control winding, and a D.C. bias winding; said second current producing means including a second self-saturating type amplifier having a main A.C. winding and a D.C. control winding; means connecting the voltage source with each of said main A.C. windings; a source of adjustable D.C. current; means connecting said last-named source with the biasing winding of the first amplifier; means connecting together the control windings and connecting them to the voltage source through a rectifier and a current limiting device which is characterized by the fact that a relatively small current is passed therethrough when the voltage is below a predetermined value and a relatively large current is passed proportional to an increase in voltage above the predetermined value; the bias and control windings of the amplifiers being arranged and adjusted so that the currents provided by said first and second current producing means are substantially the same when the voltage source has a preselected value, the current provided by said first means is greater than that provided by said second means when the value of the voltage source is below the preselected value, and the current provided by said second means is greater than that provided by said first means when the value of the voltage source is above the preselected value.

4. In combination, an A.C. voltage source; means for producing a variable compensating voltage including two D.C. coils; a first D.C. current producing means including a first self-saturating type amplifier having a main A.C.

winding, a D.C. control winding, and a D.C. bias winding; a second D.C. current producing means including a second self-saturating type amplifier having a main A.C. winding and a D.C. control winding; means connecting the main A.C. winding of the first amplifier with the voltage source and through a rectifier circuit to one of said D.C. coils; means connecting the main A.C. winding of the second amplifier with the voltage source and through a rectifier circuit to the other D.C. coil; a source of adjustable D.C. current; means connecting said last-named source with the bias winding of the first amplifier; means connecting together the control windings and connecting them to the voltage source through a rectifier circuit and a current limiting device which is characterized by the fact that only a relatively small control current is passed therethrough when the voltage is below a predetermined value, and a relatively large current is passed directly proportional to an increase in voltage above the predetermined value.

5. In combination, an A.C. voltage source; means for producing a variable compensating voltage including two D.C. coils; a first D.C. current producing means including a first self-saturating type amplifier having a main A.C. winding, a D.C. control winding, and a D.C. bias winding; a second D.C. current producing means including a second self-saturating type amplifier having a main A.C. winding and a D.C. control winding; means connecting the main A.C. winding of the first amplifier with the voltage source and through a rectifier circuit to one of said D.C. coils; means connecting the main A.C. winding of the second amplifier with the voltage source and through a rectifier circuit to the other D.C. coil; a source of adjustable D.C. current; means connecting said last-named source with the bias winding of the first amplifier; means connecting together the control windings and connecting them to the voltage source through a rectifier circuit and a current limiting device which is characterized by the fact that only a relatively small control current is passed therethrough when the voltage is below a predetermined value, and a relatively large current is passed directly proportional to an increase in voltage above the predetermined value; the bias winding of the first amplifier being wound to oppose the main A.C. winding and the control winding being wound to aid the A.C. winding; and the control winding of the second amplifier being wound to oppose its main A.C. winding.

6. In combination, an A.C. voltage source; means for producing a variable compensating voltage including two D.C. coils; a first D.C. current producing means including a first self-saturating type amplifier having a main A.C. winding, a D.C. control winding, and a D.C. bias winding; a second D.C. current producing means including a second self-saturating type amplifier having a main A.C. winding and a D.C. control winding; means connecting the main A.C. winding of the first amplifier with the voltage source and through a rectifier circuit to one of said D.C. coils; means connecting the main A.C. winding of the second amplifier with the voltage source and through a rectifier circuit to the other D.C. coil; a source of adjustable D.C. current; means connecting said last-named source with the bias winding of the first amplifier; means connecting together the control windings and connecting them to the voltage source through a rectifier circuit and a current limiting device which is characterized by the fact that only a relatively small control current is passed therethrough when the voltage is below a predetermined value, and a relatively large current is passed directly responsive to an increase in voltage above the predetermined value; the bias and control windings of the amplifiers being arranged and adjusted so that the currents provided by said first and second current producing means are substantially the same when the voltage source is at a preselected value, the current provided by said first means is greater than that provided by said second means when the value of the voltage source is below the preselected value, and the current provided by said second means is greater than that provided by said first means when the value of the voltage source is above the preselected value.

7. An automatic control for producing two currents of varying magnitude responsive to selected external conditions such as a fluctuating voltage source, comprising a first self-saturating type amplifier having a main A.C. winding, a D.C. control winding and a D.C. bias winding; a second self-saturating type amplifier having a main A.C. winding and a D.C. control winding; means connecting each of the main A.C. windings with the fluctuating voltage source; a source of adjustable D.C. current; means connecting said last-named source with the bias winding of the first amplifier; means connecting together the control windings and connecting them to the voltage source through a rectifier circuit and a current limiting device, said current limiting device being characterized by the fact that only a relatively small control current is passed therethrough when the voltage is below a predetermined value, and a relatively large current is passed which is directly proportional to the increase in voltage above the predetermined value.

8. An automatic control for producing two currents of varying magnitude responsive to selected external conditions such as a fluctuating voltage source, comprising a first self-saturating type amplifier having a main A.C. winding, a D.C. control winding and a D.C. bias winding; a second self-saturating type amplifier having a main A.C. winding and a D.C. control winding; means connecting each of the main A.C. windings with the fluctuating voltage source; a source of adjustable D.C. current; means connecting said last-named source with the bias winding of the first amplifier; means connecting together the control windings and connecting them to the voltage source through a rectifier circuit and a current limiting device, said current limiting device being characterized by the fact that only a relatively small control current is passed therethrough when the voltage is below a predetermined value, and a relatively large current is passed which is directly proportional to the increase in voltage above the predetermined value; the bias winding of the first amplifier being wound to oppose the main A.C. winding and the control winding being wound to aid the A.C. winding; and the control winding of the second amplifier being wound to oppose its main A.C. winding.

9. An automatic control for producing two currents of varying magnitude responsive to selected external conditions such as a fluctuating voltage source, comprising a first self-saturating type amplifier having a main A.C. winding, a D.C. control winding, and a D.C. bias winding; a second self-saturating type amplifier having a main A.C. winding and a D.C. control winding; means connecting each of the main A.C. windings with the fluctuating voltage source; a source of adjustable D.C. current; means connecting said last-named source with the bias winding of the first amplifier; means connecting the control windings of the two amplifiers in series circuit and across the voltage source through a rectifier circuit and a current limiting device, said current limiting device being characterized by the fact that only a relatively small control current is passed therethrough when the voltage is below a predetermined value and a relatively large current is passed therethrough when the voltage is above the predetermined value, the increase in current for each increment increase in voltage above the predetermined value being relatively very high whereby the voltage-current curve of the current limiting device is substantially flat.

10. In combination, an A.C. voltage source; means for producing a variable compensating voltage; means connecting the compensating voltage producing means in series with a circuit containing an A.C. voltage to be regulated; said compensating voltage producing means including two sets of saturable core reactors, each set containing at least two A.C. windings and one D.C. winding controlling the reactance of the A.C. windings; means connecting one A.C. winding of the first set of reactors in series with an A.C. winding of the second set of reactors and connecting the two across a source of substantially constant A.C. voltage; means connecting the junction points of the series connected A.C. reactor windings in series with the A.C. circuit containing the voltage to be regulated; first current producing means for providing a variable D.C. current for one D.C. reactor winding; and a second current producing means for providing another D.C. current for the other D.C. reactor winding, each of said current producing means being responsive to the magnitude of said A.C. voltage source above a predetermined amount.

11. In combination, an A.C. voltage source; a transformer containing a control winding and a primary winding connected to said A.C. voltage source; means for producing a variable compensating voltage; a circuit containing a second A.C. voltage connected in series with the compensating voltage producing means, said last-named means including two sets of saturable core reactors, each set of which contains A.C. windings and at least one D.C. winding controlling the reactances of the A.C. windings; means connecting an A.C. winding of the first set of reactors in series with an A.C. winding of the second set of reactors and across the control winding; means connecting the junction point between the A.C. reactor windings in series with the circuit containing the second A.C. voltage; a first D.C. current producing means for providing a variable D.C. current for one of the D.C. windings of the saturable reactors; and a second D.C. current producing means for providing another variable D.C. current for the other D.C. winding; the output of the first D.C. current producing means increasing responsive to an increase of the voltage of said A.C. voltage source above a predetermined value, and the output of the second D.C. current producing means decreasing responsive to an increase of said voltage above a predetermined value.

12. In combination, first, second and third A.C. voltage sources; two saturable reactors each having an A.C. winding and a D.C. winding; means connecting the A.C. windings in series across the second A.C. voltage source; a load connected to the junction point of both reactor A.C. windings; means connecting the load in series with the third source of A.C. voltage, the second and third voltage sources obtaining energy from the first A.C. voltage source; a first D.C. current producing means for providing a variable D.C. current for one of the D.C. windings; a second D.C. current producing source for providing a variable D.C. current for the other D.C. winding; the first D.C. current producing means providing a current smaller than the current provided by the second D.C. current producing means when the value of the A.C. voltage source is below a predetermined value, and the second D.C. current producing means providing a current smaller than the current provided by the first current producing means when the value of the voltage of the A.C. voltage source is above a predetermined value.

13. In combination, a transformer containing at least two windings; a Wheatstone type bridge circuit comprising at least four saturable core reactors connected together to provide two sets of opposed corners and two sets of opposed reactors, one set of reactors having a first D.C. coil associated therewith and the other set of reactors having a second D.C. coil associated therewith; a connection between a corner of one set of corners and one of said windings; means for impressing a first substantially constant A.C. voltage across the other set of corners; a second A.C. voltage source; first current producing means for providing a variable D.C. current for the first D.C. coil; second current producing means for providing another variable D.C. current for the second D.C. coil; and means responsive to the magnitude of the second voltage source at one rate and also to the magnitude of the second voltage source above a predetermined value at a different rate for varying both of said D.C. currents.

14. In combination, a transformer containing at least two windings; a Wheatstone type bridge circuit comprising at least four saturable core reactors connected together to provide two sets of opposed corners and two sets of opposed reactors, one set of reactors having a first D.C. coil associated therewith and the other set of reactors having a second D.C. coil associated therewith; a connection between a corner of one set of corners and one of said windings; means for impressing a first substantially constant A.C. voltage across the other set of corners; a second A.C. voltage source; first current producing means for providing a variable D.C. current for the first D.C. coil; and second current producing means for providing another variable D.C. current for the second D.C. coil; said first current producing means including a first self-saturating type amplifier having a main A.C. winding, a D.C. control winding, and a D.C. bias winding; said second current producing means including a second self-saturating type amplifier having a main A.C. winding and a D.C. control winding; means connecting the second A.C. voltage source with each of said main windings; a source of adjustable D.C. current; means connecting said last-named source with the biasing winding of the first amplifier; means connecting together the control windings and connecting them to the second A.C. voltage source through a rectifier and a current limiting device which is characterized by the fact that a relatively small current is passed therethrough when the voltage is below a predetermined value, and a relatively large current is passed proportional to an increase in voltage above the predetermined value.

15. In combination, a pair of supply leads; a Wheatstone type bridge circuit including at least four saturable core reactors connected together to provide two sets of opposed corners and two sets of opposed reactors, one set of reactors having a first D.C. coil associated therewith and the other set of reactors having a second D.C. coil associated therewith; a transformer containing a primary winding, a secondary winding, and a correcting winding, said secondary winding being connected to a pair of load leads; a connection between one side of the primary winding and one of the supply leads; a connection between the other side of the primary winding and one corner of one set of corners of the bridge circuit; a connection between the other corner of said set and the other supply lead; connections between the other set of corners and the correcting winding; first current producing means for providing a variable D.C. current for the first D.C. coil; and second current producing means for providing another variable D.C. current for the second D.C. coil; said first current producing means including a first self-saturating type amplifier having a main A.C. winding, a D.C. control winding, and a D.C. bias winding; said second current producing means including a second self-saturating type amplifier having a main A.C. winding and a D.C. control winding; means connecting the load leads with each of said main windings; a source of adjustable D.C. current; means connecting said last-named source with the biasing winding of the first amplifier; means connecting together the control windings and connecting them to the load leads through a rectifier and a current limiting device which is characterized by the fact that a relatively small current is passed therethrough when the voltage is below a predetermined value and a relatively large current is passed proportional to an increase in voltage above the predetermined value.

16. In combination, an A.C. voltage source; means for producing a variable compensating voltage including two sets of saturable core reactors, each set of which contains at least one D.C. winding for controlling the reactance thereof; first current producing means for providing a D.C. current for the D.C. winding of one set of reactors; second current producing means for providing another D.C. current for the D.C. winding of the other set of reactors; and magnetic control means associated with the first and second current producing means, said control means being responsive to variations in the voltage of said A.C. source for simultaneously varying both of said D.C. currents with respect to each other.

17. In combination, an A.C. voltage source; means for producing a variable compensating voltage including two sets of saturable core reactors, one set of which contains a first D.C. winding for controlling the reactance thereof and the other set containing a second D.C. winding for controlling the reactance thereof; first current producing means for providing a D.C. current for the first D.C. winding; second current producing means for providing another D.C. current for the second D.C. winding; and magnetic control means associated with the first and second current producing means, said control means responding to the magnitude of the voltage of said A.C. source for simultaneously varying both of said D.C. currents, one directly and the other inversely in response to changes in the magnitude of said A.C. voltage about a predetermined value.

18. In combination, an A.C. source, the voltage of which varies from a normal value to values above and below the normal value; means for producing a variable compensating voltage including two sets of saturable core reactors one set of which contains a first D.C. winding for controlling the reactance thereof and the other set of which contains a second D.C. winding for controlling the reactance thereof; first current producing means for providing a D.C. current for the first D.C. winding, and second current producing means for providing another D.C. current for the second D.C. winding; and magnetic control means associated with the first and second current producing means, said control means simultaneously varying both of said D.C. currents in response to changes in the voltage of said A.C. source for providing substantially equal D.C. currents when the latter voltage is normal and to provide unequal D.C. currents when the latter voltage varies above or below normal.

19. In combination in an electrical control system, a Wheatstone type bridge circuit comprising two sets of opposed saturable core reactors connected together to provide first and second sets of opposed bridge corners, one set of reactors including a first D.C. control winding and the other set of reactors including a second D.C. control winding; means for impressing a voltage across the first set of opposed bridge corners; first current producing means for providing a D.C. current for the first D.C. winding, second current producing means for providing a D.C. current for the second D.C. winding; and control means associated with the first and second current producing means, said control means being responsive to selected electrical changes in the system for varying the flow of D.C. current from both of said current producing means inversely with respect to each other to produce a variable voltage across said second set of opposed bridge corners.

20. In combination in an electrical control system, power input and output circuits; a Wheatstone type bridge circuit comprising two sets of opposed saturable core reactors, one set of which includes at least two A.C. windings and a first D.C. winding, and the other set of which includes at least two A.C. windings and a second D.C. winding, the A.C. windings of the two sets being connected together to provide first and second sets of opposed bridge corners; means for impressing an A.C. voltage across the first set of bridge corners; said second set of corners being connected in a circuit between the power input and output circuits; first current producing means for providing a D.C. current for the first D.C. winding, second current producing means for providing another D.C. current for the second D.C. winding; and electrical control means associated with the first and second current producing means, said control means including detector means responsive to selected electrical changes in the system for varying the flow of D.C. current from both of said current producing means inversely with respect to each other to produce a compensating voltage across said second set of opposed bridge corners.

21. In combination in an electrical control system having an A.C. input circuit and a load circuit; a Wheatstone type bridge circuit comprising two sets of opposed saturable core reactors, each set including at least two A.C. windings and one D.C. winding, the A.C. windings of the two sets being connected together to provide two sets of opposed bridge corners; transformer means for impressing an A.C. voltage across one set of bridge corners; means including the other set of bridge corners for connecting said bridge circuit in a circuit in series with said load circuit; detector means for producing a signal responsive to variations in an electrical condition of the system; first and second amplifiers each having a signal input circuit and an output circuit; means connecting the output circuit of one of the amplifiers with the D.C. winding of one set of reactors; means connecting the output circuit of the other amplifier with the D.C. winding of the other set of reactors; and means energizing the signal input circuit of both amplifiers in response to said signal for varying the output of both amplifiers inversely with respect to each other.

22. In an electrical control system having power input and output circuits; the combination therewith of a bridge circuit having bridge input and output terminals and including at least two saturable reactors each connected in a different arm of the bridge circuit, each of said reactors having a D.C. control winding; means for supplying a voltage to the bridge input terminals; means for connecting the bridge output terminals in a circuit in series between the power input and output circuits; a pair of magnetic amplifiers each having a signal input circuit and an output circuit; means for supplying D.C. current to the D.C. control winding of one of said reactors in response to the output of one of said amplifiers; means for supplying D.C. current to the D.C. control winding of the other of said reactors in response to the output of the other of said amplifiers; means for producing a signal responsive to an electrical condition of the system; and means for energizing said signal input circuit of each of said amplifiers in response to said signal for varying the outputs of said amplifiers inversely with respect to each other.

References Cited in the file of this patent

UNITED STATES PATENTS

| 1,824,577 | Sorensen | Sept. 22, 1931 |
| 2,079,206 | Graff et al. | May 4, 1937 |
| 2,432,399 | Edwards | Dec. 9, 1947 |
| 2,807,754 | Steinitz | Sept. 24, 1957 |